Patented July 25, 1950

2,516,289

UNITED STATES PATENT OFFICE 2,516,289

PROCESS FOR PRODUCING TETRASUBSTITUTED PIPERAZINES

Paul L. Barrick, Carleton T. Handy, and Richard S. Schreiber, Wilmington, Del., assignors to E. I. du Pont de Nemours & Company, Wilmington, Del., a corporation of Delaware No Drawing. Application April 1, 1948, Serial No. 18,486

6 Claims. (Cl. 260—268)

This invention relates to hydrogenation processes and more particularly to a method for the preparation of tetrasubstituted piperazines.

It is known that disubstituted piperazines, such as, 2,5-dimethylpiperazine can be obtained by hydrogenating alpha-isonitrosoacetone, the monoxime of an aldehyde, over platinum in acetic acid solution. Tetrasubstituted piperazines have, however, been heretofore made only by laborious lengthy procedures. Thus, 2,3,5,6-tetramethylpiperazine is made by chemically reducing diacetyl monoxime either with stannous chloride and hydrochloric acid or with zinc and hydrochloric acid, followed by neutralization of the hydrochloride to obtain tetramethyldihydropyrazine which is oxidized to tetramethylpyrazine. The tetramethylpyrazine is finally reduced either chemically or catalytically to the desired tetramethylpiperazine.

An object of the present invention is the preparation of tetrasubstituted piperazines by a simple process. A further object is the preparation of tetrasubstituted piperazines by the direct hydrogenation of a monoxime of an alpha-diketone. Additional objects will become apparent as the invention is more fully described.

According to the present invention, a monoxime of an alpha-diketone is contacted with hydrogen over a palladium catalyst in an acid medium at a temperature in the range of 20° C. to 150° C.

The following general description illustrates one manner of practicing this invention.

A pressure resistant reaction vessel is charged with the monoxime of the alpha-diketone, a palladium hydrogenation catalyst, and an acid such as acetic acid in amount which is at least molar equivalent to the alpha-diketone monoxime, and the vessel is closed. The reactor is placed in a shaker machine, which contains heating means and is connected to a source of high pressure hydrogen. Hydrogen is expanded into the reactor and heating and agitation are started. The reductive condensation is conveniently carried out at temperatures in the range of 20° to 150° C. and under a pressure in excess of atmospheric and preferably over 50 lb./sq. in. Reaction is indicated by a pressure drop. It is usually desirable to maintain the pressure within the selected range throughout the reaction period by intermittent additions of hydrogen. Cessation of hydrogen absorption is indicative of the end of the reaction. The reactor is then cooled, excess hydrogen is bled off, the vessel is opened, the contents discharged, and the catalyst is removed by filtration. The filtrate is then neutralized to liberate the tetrasubstituted piperazine. The tetrasubstituted piperazine is purified by means well known to those skilled in the art, e. g., distillation.

The alpha-diketones from which the monoximes used in the practice of this invention are obtained are those of the general formula R—CO—CO—R', in which the R's are monovalent hydrocarbon radicals, which may be the same or different. Examples of such are 2,3-butanedione; 2,3-pentanedione; 2,2-dimethyl-3,4-nonanedione; 4-methyl-2,3-pentanedione; 5,6-dodecanedione; 3-phenyl-2,3-propanedione; benzil; 3-cyclohexyl-2,3-propanedione; 1,2-cyclohexanedione; 1,2-cyclopentanedione; and the like.

The process of this invention is carried out in an organic acid medium and suitable acids are acetic, propionic, and the like. The amount of acid is at least molar equivalent to the diketone monoxime. The use of larger amounts is desirable because the acid then acts also as a reaction medium. Of the acids, the preferred is acetic acid because of its availability and utility. Using acetic acid the amount most generally employed is two moles per mole of the diketone monoxime. If desired, there can be used in conjunction with the acid organic solvents such as alcohols, esters, ethers, and the like.

The process of this invention may be operated at temperatures of from 20° to 150° C. Generally, however, temperatures in the range of 30° to 90° C. are employed since under these conditions satisfactory rates of reaction with minimum of side reaction product formation are obtained. This range therefore constitutes the preferred operating temperature conditions.

The pressure in the system is adjusted with hydrogen, and, generally, the process is operated at pressures in the range of 500 to 2000 lb./sq. in. Although the upper pressure is not critical and is only restricted by the limitations of the equipment employed, for practical reasons the use of pressures above 20,000 lb./sq. in. has no advantages.

In the process of this invention there may be employed any palladium catalyst. Thus, there may be used supported or unsupported metallic palladium, palladium oxide or palladium salts as catalysts. Suitable supports are charcoal, pumice, kieselguhr, alumina, barium sulfate, barium carbonate, and the like. The preferred catalysts are those in which palladium is supported on charcoal and a typical preparation of such catalyst is the following:

A solution of 8.33 g. of palladium chloride in 5.5 ml. of concentrated hydrochloric acid and 40 ml. of water is prepared by heating the mixture on a steam bath. The resulting solution is poured into a solution of 135 g. of sodium acetate trihydrate in 500 ml. of water contained in a 1 liter reduction bottle. Forty-five grams of activated carbon are added and the mixture hydrogenated until absorption ceases after 1 to 2 hours. The catalyst is collected on a Buchner funnel and washed with 2 l. of water in five portions. The filter cake, after removal of most of the water, is dried in air and then in a desiccator over calcium chloride. The catalyst (48–50 g. of about 10% Pd on C) is stored, after being powdered, in a tightly closed bottle.

The amount of palladium catalyst is generally in the range of from 0.01 to 10% by weight of the diketone monoxime. As a rule, however, from 0.10 to 5%, by weight of the diketone monoxime is used since with such amounts satisfactory rates of conversion are obtained.

The examples which follow are submitted to illustrate and not to limit this invention. Parts are by weight, unless otherwise specified.

*Example I*

A solution of 50.5 parts of diacetyl monoxime in 100 parts of glacial acetic acid was charged into a stainless steel autoclave with 3 parts of a 10% palladium-on-carbon catalyst. The autoclave was closed and pressured with hydrogen to about 2000 lbs./sq. in. On agitating the autoclave, an exothermic reaction occurred with rapid absorption of hydrogen. After 1 hour at 75° C. the hydrogen absorption was complete, and a pressure drop of about 1800 lbs./sq. in. was obtained. The pressure was released and the product filtered to remove the catalyst. The 2,3,5,6-tetramethylpiperazine was isolated by neutralizing the acetic acid with sodium hydroxide and extracting the tetramethylpiperazine with ether. A colorless, liquid, 2,3,5,6-tetramethylpiperazine, boiling at about 81° C. under 25 mm. pressure was obtained.

*Example II*

An alternate method was used for isolating and purifying the 2,3,5,6-tetramethylpiperazine from a run similar to the above. After removing the catalyst, the acetic acid filtrate was treated with a solution of 40 parts of sodium nitrite in 120 parts of water. An immediate reaction occurred to give 45 parts of solid 1,4-dinitroso-2,3,5,6-tetramethylpiperazine melting at about 95–97° C. which is 90% of the theoretical amount based on diacetyl monoxime. The two nitroso groups are easily removed by treatment with concentrated hydrochloric acid or by catalytic hydrogenation to yield mainly a liquid stereoisomer of 2,3,5,6-tetramethylpiperazine boiling at about 81° C. under 25 mm. pressure.

*Example III*

The reaction mixture containing diacetyl monoxime resulting from treating 372 parts of methyl ethyl ketone containing 20 parts of concentrated hydrochloric acid with 453 parts of commercial concentrated ethyl nitrite containing about 10% alcohol was treated with 17 parts of concentrated ammonium hydroxide and filtered to remove the precipitated ammonium chloride. The filtrate was charged into an autoclave with 750 parts of glacial acetic acid and 3.5 parts of palladium catalyst supported on finely divided carbon and the vessel pressured at room temperature with hydrogen to about 1000 lb./sq. in. On agitating the reaction mixture, a rapid absorption of hydrogen was obtained with considerable evolution of heat which raises the temperature to 50° C. The hydrogenation was complete in about 3 hours at 50° C. After filtering to remove the catalyst, the 2,3,5,6-tetramethylpiperazine was isolated and purified as described in Example 2. A yield of 321 parts of 1,4-dinitroso-2,3,5,6-tetramethylpiperazine melting at about 95–97° C. was obtained which corresponds to a practically complete conversion of the diacetyl monoxime present in the reaction mixture to 2,3,5,6-tetramethylpiperazine.

Although in the examples certain definite conditions of temperature, pressure, concentration, duration of reaction, catalyst concentration, etc., are used, it is to be understood that these are all interdependent variables and that variation in one necessitates compensating adjustments in the others.

The tetrasubstituted piperazines produced according to this invention are useful as dye intermediates, rubber chemicals, pharmaceuticals, polyamide intermediates, etc.

It will be understood that, as pointed out above, many details of procedure, materials and apparatus may be varied and that while the examples and foregoing description are adequate to allow the invention to be reproduced readily, the scope of the invention includes such variations. We intend to be limited only by the following claims:

1. A process for the preparation of a tetrasubstituted piperazine which comprises hydrogenating a monoxime of an alpha-diketone having the general formula:

$$R-CO-CO-R^1$$

wherein R and $R^1$ are monovalent hydrocarbon radicals at a temperature in the range of 20° to 150° C. and a pressure in excess of atmospheric in an organic acid medium and in the presence of a palladium catalyst, and thereafter isolating said tetrasubstituted piperazine from the reaction mixture.

2. The process of claim 1, wherein the temperature range is from 30 to 90° C.

3. The process of claim 1, wherein the pressure range is from 50 to 2000 pounds per square inch.

4. The process of claim 1, wherein the palladium catalyst is metallic palladium supported on charcoal.

5. The process of claim 1, wherein the amount of palladium catalyst present is in the range of from 0.01 to 10% by weight of the diketone monoxime.

6. A process as claimed in claim 1, wherein 2,3,5,6-tetramethylpiperazine is prepared from diacetyl monoxime.

PAUL L. BARRICK.
CARLETON T. HANDY.
RICHARD S. SCHREIBER.

REFERENCES CITED

The following references are of record in the file of this patent:

Godchot et al., Bull. Soc. Chim. 51, 359–360 (1932).

Adkins, Ind. and Eng. Chem. 32, 1189–1192 (1940).